(12) United States Patent  
Kasai et al.

(10) Patent No.: US 8,891,188 B2  
(45) Date of Patent: Nov. 18, 2014

(54) BREAKDOWN PREDICTION DEVICE, BREAKDOWN PREDICTION METHOD, AND BREAKDOWN PREDICTION PROGRAM

(75) Inventors: Shigeru Kasai, Tokyo (JP); Yasuhiro Sasaki, Tokyo (JP); Hiroshi Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 97 days.

(21) Appl. No.: 13/574,141

(22) PCT Filed: Jan. 20, 2011

(86) PCT No.: PCT/JP2011/050945  
§ 371 (c)(1),  
(2), (4) Date: Jul. 19, 2012

(87) PCT Pub. No.: WO2011/090104  
PCT Pub. Date: Jul. 28, 2011

(65) Prior Publication Data  
US 2012/0287526 A1 Nov. 15, 2012

(30) Foreign Application Priority Data  
Jan. 21, 2010 (JP) ................................. 2010-011193

(51) Int. Cl.  
*G11B 27/36* (2006.01)  
*G11B 20/10* (2006.01)  
*G11B 20/18* (2006.01)  
*G11B 19/04* (2006.01)

(52) U.S. Cl.  
CPC .......... *G11B 20/10009* (2013.01); *G11B 27/36* (2013.01); *G11B 20/10314* (2013.01); *G11B 20/10027* (2013.01); *G11B 20/1816* (2013.01); *G11B 2220/2516* (2013.01); *G11B 19/048* (2013.01)

USPC .......................................................... 360/31

(58) Field of Classification Search  
USPC ............ 360/31, 137, 69, 90.2, 65, 75, 77.02, 360/78.09; 369/247.1; 248/559; 123/192.1; 188/378; 340/683, 686.4; 73/1.82  
See application file for complete search history.

(56) References Cited

U.S. PATENT DOCUMENTS

| | | | |
|---|---|---|---|
| 6,199,422 B1 * | 3/2001 | Boerhout et al. | 73/1.82 |
| 6,265,982 B1 * | 7/2001 | Ostwald | 340/683 |
| 6,549,349 B2 * | 4/2003 | Sri-Jayantha et al. | 360/31 |

(Continued)

FOREIGN PATENT DOCUMENTS

| | | |
|---|---|---|
| JP | 7-77459 A | 3/1995 |
| JP | 2001067770 A | 3/2001 |

(Continued)

OTHER PUBLICATIONS

International Search Report for PCT/JP2011/050945 dated Apr. 26, 2011.

(Continued)

*Primary Examiner* — Ali Neyzari  
(74) *Attorney, Agent, or Firm* — Sughrue Mion, PLLC

(57) ABSTRACT

A breakdown prediction device of the present invention includes: a vibration measurement unit that measures vibrations generated from a device being monitored; and a signal processing unit that performs breakdown prediction when a specific vibration is measured at the vibration measurement unit, a maximum vibration amplitude value of the vibration exceeding an upper limit vibration amplitude threshold, and a vibration amplitude value thereof being below a lower limit vibration amplitude threshold at a point in time when a specified time is reached from a point in time when the vibration exceeds the upper limit vibration amplitude threshold.

7 Claims, 7 Drawing Sheets

(56) References Cited

U.S. PATENT DOCUMENTS

| | | | |
|---|---|---|---|
| 6,937,422 B2* | 8/2005 | Dang et al. | 360/77.02 |
| 7,477,466 B2* | 1/2009 | Yoshida et al. | 360/31 |
| 2004/0090698 A1 | 5/2004 | Dang et al. | |
| 2007/0291389 A1 | 12/2007 | Yoshida et al. | |

FOREIGN PATENT DOCUMENTS

| | | |
|---|---|---|
| JP | 2003-123419 A | 4/2003 |
| JP | 2003150406 A | 5/2003 |
| JP | 2004-63040 A | 2/2004 |
| JP | 2004-158175 A | 6/2004 |
| JP | 2007-335013 A | 12/2007 |
| JP | 2008198322 A | 8/2008 |
| WO | 2010/109809 A1 | 9/2010 |

OTHER PUBLICATIONS

Communication dated Jul. 29, 2014, issued by the Japanese Patent Office in counterpart Application No. 2011550945. Partial.

* cited by examiner

FIG. 5

| EVALUATION CONDITION | SETTING VALUES OF BREAKDOWN PREDICTION DEVICE | BREAKDOWN DETERMINATION RESULT |
|---|---|---|
| CONDITION 1<br>CONTINUOUS OPERATION OF MAGNETIC DISK DEVICE AT A TEMPERATURE OF 85°C OR LOWER. EVALUATION UNDER QUIET CONDITIONS | DIAGNOSIS TIME T FOR ONE TIME IS 20 SECONDS.<br>UPPER LIMIT VIBRATION AMPLITUDE THRESHOLD Amax IS 5 TIMES MAXIMUM VIBRATION AMPLITUDE VALUE AT TIME OF NORMAL OPERATION.<br>LOWER LIMIT VIBRATION AMPLITUDE THRESHOLD Amin IS 1.5 TIMES MAXIMUM VIBRATION AMPLITUDE VALUE AT TIME OF INITIAL NORMAL OPERATION.<br>TIME t1 IS 50 ms.<br>SPECIFIC VIBRATION GENERATION FREQUENCY THRESHOLD FOR DETERMINATION N OF SPECIFIC VIBRATION IS 100 TIMES. | WARNING DISPLAY GENERATED 3 HOURS BEFORE BREAKDOWN OF MAGNETIC DISK DEVICE. BREAKDOWN OF THE MAGNETIC DISK DEVICE WAS FORECAST. |
| CONDITION 2<br>CONTINUOUS OPERATION OF MAGNETIC DISK DEVICE AT A TEMPERATURE OF 85°C OR LOWER. EVALUATION UNDER NOISY CONDITIONS SUSCEPTIBLE TO DISTURBANCES (THREE PEOPLE WORKING CONTINUOUSLY ON EXPERIMENTS ETC.) | DIAGNOSIS TIME T FOR ONE TIME IS 20 SECONDS.<br>UPPER LIMIT VIBRATION AMPLITUDE THRESHOLD Amax IS 5 TIMES MAXIMUM VIBRATION AMPLITUDE VALUE AT TIME OF NORMAL OPERATION.<br>LOWER LIMIT VIBRATION AMPLITUDE THRESHOLD Amin IS 1.5 TIMES MAXIMUM VIBRATION AMPLITUDE VALUE AT TIME OF INITIAL NORMAL OPERATION.<br>TIME t1 IS 50 ms.<br>SPECIFIC VIBRATION GENERATION FREQUENCY THRESHOLD FOR DETERMINATION N OF SPECIFIC VIBRATION IS 100 TIMES. | WARNING DISPLAY GENERATED 3 HOURS BEFORE BREAKDOWN OF MAGNETIC DISK DEVICE. BREAKDOWN OF THE MAGNETIC DISK DEVICE WAS FORECAST. |

BREAKDOWN PREDICTION DEVICE, BREAKDOWN PREDICTION METHOD, AND BREAKDOWN PREDICTION PROGRAM

CROSS REFERENCE TO RELATED APPLICATIONS

This application is a National Stage of International Application No. PCT/JP2011/050945 filed Jan. 20, 2011, claiming priority based on Japanese Patent Application No. 2010-011193 filed Jan. 21, 2010, the contents of all of which are incorporated herein by reference in their entirety.

TECHNICAL FIELD

The present invention relates to a breakdown prediction device, a breakdown prediction method, and a breakdown prediction program that predicts the breakdown of devices utilizing a mechanical mechanism, such as disk storage devices, including magnetic disk devices and magnetic optical disk devices, and cooling fans, and piezoelectric backlight power sources.

BACKGROUND ART

The development of internet technology is contributing to the popularization of digital information technologies of precision electronic devices, such as computer devices, and its user-friendliness for users is increasing. In electronic devices such as computer devices, as mentioned above, devices utilizing a mechanical mechanism, such as disk storage devices, including magnetic disk devices and magnetic optical disk devices, and cooling fans, and piezoelectric backlight power sources are installed. For example, magnetic disk devices for computers are configured by a recording medium, a magnetic head, a slider, a head arm, a voice coil motor, and the like. With regard to magnetic disk devices, in addition to being made a high density and a high capacity, a high reliability is required since information content, such as valuable images, video data, and analysis data, are handled. However, the breakdown rate of disk storage devices is high compared to semiconductor storage devices, since they have many mechanical components and mechanical parts. There is a risk of important data being lost as a result of breakdowns due to the degradation of the mechanical components and the mechanical parts accompanying high-frequency operations, and sudden breakdowns, and of the users incurring economic and psychological losses. Therefore, in recent years, the development of breakdown prediction in storage devices is being actively advanced.

Technology relating to breakdown prediction of a magnetic disk device is disclosed in Patent Document 1. FIG. 6 is a block diagram showing a schematic configuration of the magnetic disk device disclosed in Patent Document 1. In FIG. 6, the magnetic disk device 201 includes, as a means relating to the breakdown prediction, a lead channel 206 having an automatic gain control (AGC), a memory 209, a disk medium 215, a head monitoring unit 217, and a failure prediction unit 218.

Automatic gain control (AGC) refers to an adjustment mechanism that automatically amplifies the signal output from the head at the time servo data is read out from the disk medium 215. For example, when the head floats and separates from the disk medium 215, the effect on the disk medium 215 of the magnetic field generated at the head tip becomes weaker, and hence the output signal from the head is automatically amplified. The failure prediction unit 218 detects abnormal floating of the head based on whether or not the signal output strength of the AGC is within a predetermined range, or in other words, whether it is an amplification factor corresponding to a state in which the reading and writing can be performed normally.

Next, the failure prediction operation of the magnetic disk device disclosed in Patent Document 1 is described. When a fixed timing for measuring the frequency of abnormal floating of the head eventuates, the head monitoring unit 217 measures part of the measurement zone provided within the disk medium 215 by monitoring the value of the AGC provided within the lead channel 216. Then the failure prediction unit 218 detects abnormal floating of the head in a case where the value of the AGC measured at the head monitoring unit 217 is larger than an AGC reference value recorded on the disk medium 215. The failure prediction unit 218 stores the abnormal floating cumulative frequency of the head, and the abnormal floating frequency, for each measurement time segment (for example, in segments A, B, C and D in sequence from the oldest measurement time) which is periodically performed, in the memory 209. The failure prediction unit 218 creates a graph composed of the measurement time segments from the time of shipment, and the abnormal floating frequency, from the measurement data stored in the memory 209. The failure prediction unit 218 calculates whether or not the abnormal floating frequency is in an increasing trend, or if the cumulative frequency of the abnormal floating frequency from the time of shipment exceeds a threshold.

In a case where the abnormal floating frequency is in an increasing trend, the failure prediction unit 218 confirms whether or not the abnormal floating frequency of the head at the time of the previous measurement recorded in the memory 209 is in an increasing trend. In a case where also at the previous time, the abnormal floating frequency of the head is in an increasing trend, the failure prediction unit 218 determines that the probability of failure occurring is high, and issues a warning.

In a case where the abnormal floating frequency is not in an increasing trend, the failure prediction unit 218 confirms whether or not the cumulative frequency of the abnormal floating frequency recorded in the memory 209 exceeds a threshold. In a case where the cumulative frequency of the abnormal floating frequency exceeds the threshold, the failure prediction unit 218 determines that the probability of a failure occurring is high, and issues a warning.

The foregoing is the technology disclosed in Patent Document 1 relating to failure prediction in a magnetic disk device. Other technology related to breakdown prediction is disclosed in Patent Document 2. In Patent Document 2, a bearing abnormality detection device, which detects AE (acoustic emissions) from a bearing and diagnoses abnormalities, is disclosed. AE refers to a phenomenon in which, at the time a material deforms or cracking occurs, the strain energy stored in the interior of the material is discharged as an elastic wave.

The configuration of the bearing abnormality detection device disclosed in Patent Document 2 is described with reference to FIG. 7. In FIG. 7, the bearing abnormality detection device includes a peak hold circuit 306, a reference value generator 307, a comparator 308, an A/D convertor 310, and a CPU (central processing unit) 311. Description of means not directly related to abnormality detection is omitted.

Next, the operation of abnormality detection in the bearing abnormality detection device disclosed in Patent Document 2 is described. When the peak hold circuit 306 detects an AE signal, it detects and retains the peak value of this AE signal, and outputs the peak value to the A/D convertor 310 and the comparator 308. The comparator 308 compares the reference value generated by the reference value generator 307, and the peak value from the peak hold circuit 306, and when the peak value exceeds the reference value, outputs a trigger signal to the A/D convertor 310 and the CPU 311.

When the A/D convertor 310 receives the trigger signal from the comparator 308, it becomes capable of processing the AE signal, and converts the AE signal from analogue to digital. Also, when the CPU 311 receives the trigger signal from the comparator 308, it becomes capable of processing the AE signal, captures the digitalized AE signal from the A/D convertor 310, and diagnoses an abnormality of the bearing. Therefore, the A/D convertor 310 and the CPU 311 perform operations for signal processing the AE signal only when the peak value of the AE signal exceeds the reference value. In other words, the A/D convertor 310 and the CPU 311 do not perform the operations for signal processing the AE signal while the peak value of the AE signal is less than the reference value. That is to say, the A/D convertor 310 and the CPU 311 do not perform the operations of signal processing of the AE signal while the AE signal is a value that is not valid for abnormality diagnosis of the bearing. Therefore it is possible to provide a breakdown prediction system without lowering the normal operation performance and with a high breakdown prediction accuracy.

PRIOR ART DOCUMENTS

Patent Documents

[Patent Document 1] Japanese Unexamined Patent Application, First Publication No. 2007-335013.
[Patent Document 2] Japanese Unexamined Patent Application, First Publication No. H07-077459.

SUMMARY OF THE INVENTION

Problem to be Solved by the Invention

However, in the breakdown prediction in a magnetic disk device disclosed in Patent Document 1 mentioned above, there are the following problems.

That is to say, since it cannot clearly distinguish between head floating attributable to sudden disturbances or temporary noise of the equipment within the device, and head floating accompanying mechanical breakdown degradation of the magnetic disk device, the breakdown prediction accuracy is low. Furthermore, there is concern that head floating resulting from sudden disturbances or temporary noise of the equipment within the device are erroneously counted as an error, leading to a diagnosis that a breakdown is imminent regardless of the normal status. Furthermore, the installation conditions and the usage environment conditions of the computer device in which the magnetic disk device is loaded vary with the user. Therefore it is difficult to extract the head floating frequency attributable solely to sudden disturbances under the respective conditions.

Also with the bearing abnormality detection device disclosed in Patent Document 2, in the same manner as mentioned above, the AE signals attributable to sudden disturbances or temporary noise of the equipment within the device, and the AE signals accompanying mechanical breakdown degradation of the device cannot be clearly distinguished. Therefore there is a problem in that the breakdown prediction accuracy is low.

The present invention has been achieved taking these problems into consideration. An exemplary object of the present invention is to provide a breakdown prediction device, a breakdown prediction method, and a breakdown prediction program that is able to predict breakdowns in devices utilizing a mechanical mechanism, such as disk storage devices, including magnetic disk devices and magnetic optical disk devices, and cooling fans, and piezoelectric backlight power sources, with a high accuracy.

Means for Solving the Problem

In order to solve the problems mentioned above, a breakdown prediction device of the present invention includes: a vibration measurement unit that measures vibrations generated from a device being monitored; and a signal processing unit that performs breakdown prediction when a specific vibration is measured at the vibration measurement unit, a maximum vibration amplitude value of the vibration exceeding an upper limit vibration amplitude threshold, and a vibration amplitude value thereof being below a lower limit vibration amplitude threshold at a point in time when a specified time is reached from a point in time when the vibration exceeds the upper limit vibration amplitude threshold.

A breakdown prediction method of the present invention includes: a vibration measurement step of measuring vibrations generated from a device being monitored; and a signal processing step of performing breakdown prediction when a specific vibration is measured at the vibration measurement step, a maximum vibration amplitude value of the vibration exceeding an upper limit vibration amplitude threshold, and a vibration amplitude value thereof being below a lower limit vibration amplitude threshold at a point in time when a specified time is reached from a point in time when the vibration exceeds the upper limit vibration amplitude threshold.

A breakdown prediction program of the present invention makes a computer operate as: a unit for measuring vibrations generated from a device being monitored; and a unit for performing breakdown prediction when a specific vibration is measured at the unit for performing the vibrations, a maximum vibration amplitude value of the vibration exceeding an upper limit vibration amplitude threshold, and a vibration amplitude value thereof being below a lower limit vibration amplitude threshold at a point in time when a specified time is reached from a point in time when the vibration exceeds the upper limit vibration amplitude threshold.

Effect of the Invention

The present invention is able to predict breakdown in the device being monitored with a high accuracy. The device being monitored represents devices utilizing a mechanical mechanism, such as disk storage devices, including magnetic disk devices and magnetic optical disk devices, and cooling fans, and piezoelectric backlight power sources.

BRIEF DESCRIPTION OF THE DRAWINGS

FIG. 5 is a diagram showing a breakdown prediction result for a case where the breakdown prediction device of the exemplary embodiment of the present invention is applied to a magnetic disk device that is loaded in a computer device.

EMBODIMENTS FOR CARRYING OUT THE INVENTION

Hereunder, preferred exemplary embodiments for carrying out the present invention are described in detail with reference to the drawings.

Figure 1:
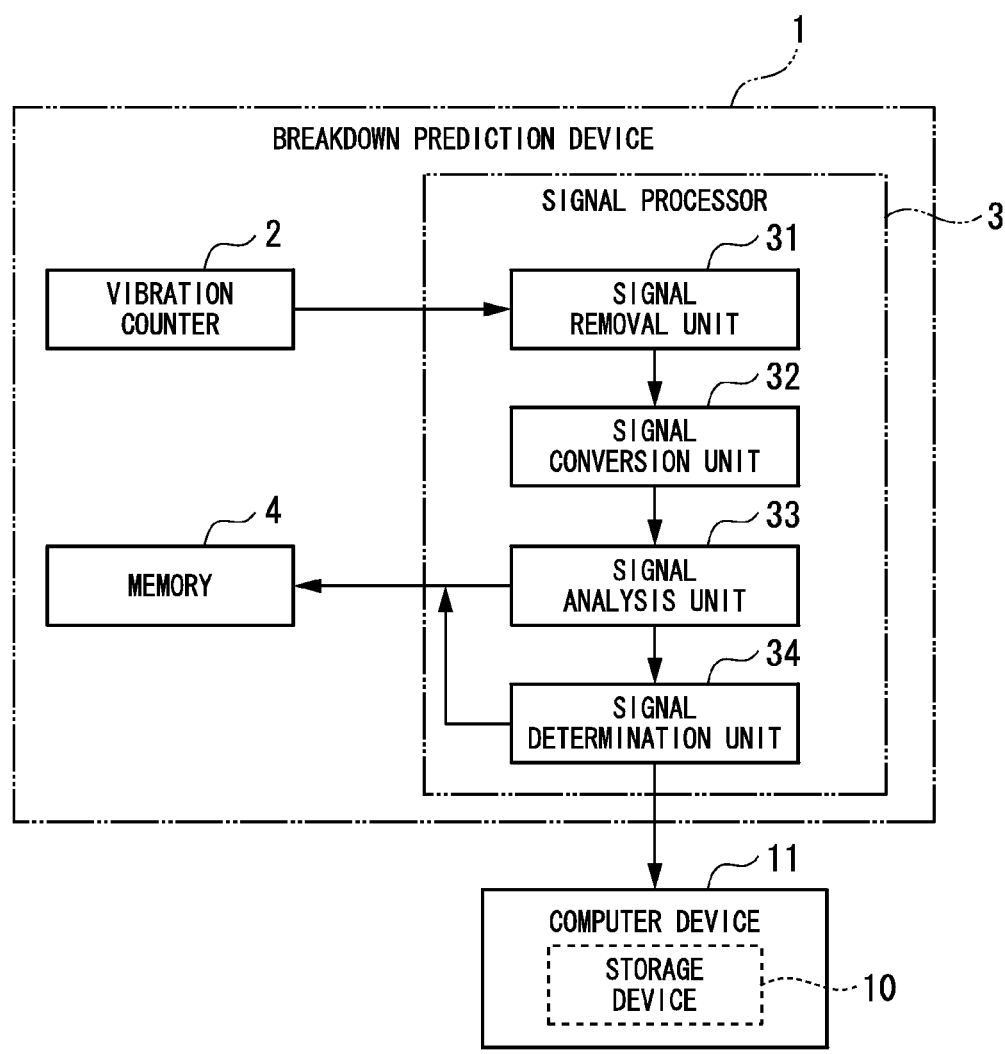
FIG. 1 is a block diagram showing a schematic configuration of a breakdown prediction device according to one exemplary embodiment of the present invention.

FIG. 1 is a block diagram showing a schematic configuration of a breakdown prediction device according to an exemplary embodiment of the present invention. In FIG. 1, the breakdown prediction device 1 of the present exemplary embodiment includes a vibration counter 2, a signal processor 3, and a memory 4. The vibration counter 2 is attached to a storage device 10 and measures the vibrations generated from the storage device 10. The signal processor 3 performs breakdown prediction based on the generation frequency of a specific vibration within the vibrations measured by the vibration counter 2. The memory 4 stores information such as the specific vibrations and the generation time thereof, and the generation frequency of the specific vibrations generated within a specified diagnosis time.

The storage device 10 is an electronic equipment device such as a magnetic disk device provided with a data recording medium and a magnetic head for reading out the data on the medium and writing data to the medium. The breakdown prediction device 1 of the present exemplary embodiment is applied to a storage device 10 loaded in a computer device 11, and operates at either or both of the time of starting up and the time of shutting down the computer device 11. The computer device 11 is a device well-known to those skilled in the art, and since it does not directly relate to the present exemplary embodiment, a detailed configuration thereof is omitted.

The signal processor 3 performs breakdown prediction based on the generation frequency of the specific vibration mentioned above. The signal processor 3 includes a signal removal unit 31, a signal conversion unit 32, a signal analysis unit 33, and a signal determination unit 34. The signal removal unit 31 removes signals that are unnecessary for vibration analysis, from the vibration analog signals output from the vibration counter 2. That is to say, the signal removal unit 31 applies a filter to the vibration analog signal, and extracts the component of the vibrations measured by the vibration counter 2 from 10 Hz to 20 kHz. The signal conversion unit 32 converts the vibration analog signal output from the signal removal unit 31 to a digital signal. By making the sampling frequency in the analog-to-digital conversion of the signal conversion unit 32 approximately 52 kHz or more, which is the signal processing target maximum frequency, the measured vibrations can be nearly faithfully reproduced, and processing with a high accuracy becomes possible.

Figure 2:
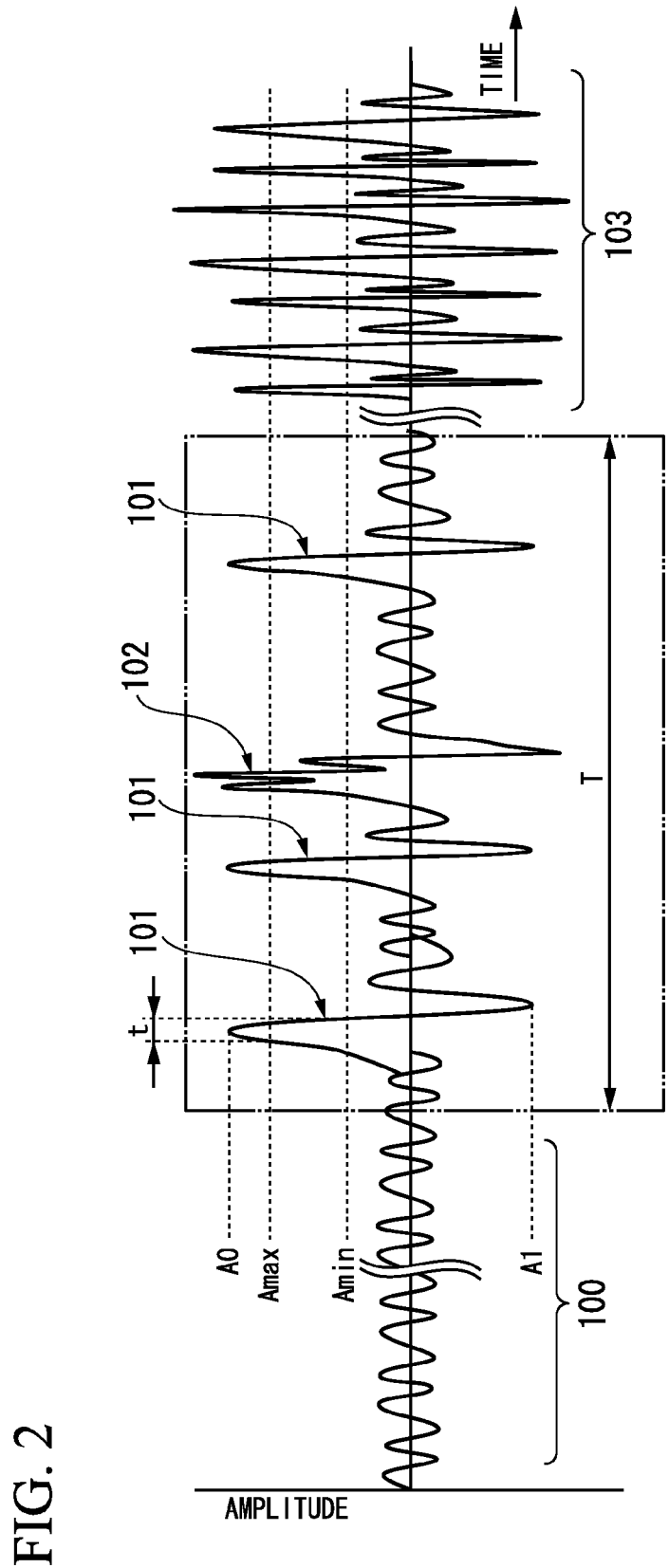
FIG. 2 is a diagram showing a vibration waveform at the time of normal operation, a vibration waveform corresponding to a breakdown in progress, and a vibration waveform at the time of a breakdown, in a magnetic disk device, which is a type of storage device in the exemplary embodiment of the present invention.

The signal analysis unit 33 performs time waveform analysis on the vibration digital signal output from the signal conversion unit 32. FIG. 2 is a diagram showing an example of a vibration waveform at the time of normal operation, a vibration waveform associated with a breakdown in progress, and a vibration waveform at the time of a breakdown, in a magnetic disk device, which is a type of storage device 10. In FIG. 2, the waveform 100 is a vibration at the time of normal operation of the magnetic disk device. The waveform 101 is a vibration associated with a breakdown in progress in the magnetic disk device. The waveform 102 is a sudden vibration due to a disturbance or the like. The waveform 103 is a vibration at the time of a breakdown in the magnetic disk device. In FIG. 2, "t" represents a specified time, "T" represents a diagnosis time, "Amax" represents an upper limit vibration threshold, and "Amin" represents a lower limit vibration threshold. The specified time t, the upper limit vibration threshold Amax, and the lower limit vibration threshold Amin are information that becomes a determination standard of whether or not the vibration is a vibration associated with a breakdown in progress, that is to say, a specific signal, and are determined by performing a test beforehand for example.

In a case where the vibration amplitude A0 exceeds the upper limit vibration amplitude threshold Amax, the signal analysis unit 33 determines whether or not the vibration amplitude value A1 at the specified time t seconds after the time in which the vibration amplitude thereof is observed (that is to say, the time at which the vibration amplitude A0 exceeded the upper limit vibration amplitude threshold Amax) is below the lower limit vibration amplitude threshold Amin. In a case where the vibration amplitude value A1 is below the lower limit vibration amplitude threshold Amin, the signal analysis unit 33 counts the vibration in which the vibration amplitude value A0 exceeds the upper limit vibration amplitude threshold Amax, and the vibration amplitude value A1 at the specified time t seconds later is below the lower limit vibration amplitude threshold Amin, as one specific vibration. Furthermore, in a case where a specific vibration is detected, the signal analysis unit 33 stores the vibration amplitude value A0, the vibration amplitude value A1, and their generation time (measurement data) in the memory 4.

By setting the upper limit vibration amplitude threshold Amax from 3 times to 5 times the maximum vibration amplitude value at the time of initial normal operation, and by setting the lower limit vibration amplitude threshold Amin from 0.5 times to 1.5 times the maximum vibration amplitude value at the time of initial normal operation, it becomes easier to detect the vibrations attributable to the mechanical components and the mechanical parts that configure the magnetic disk device.

Returning to FIG. 1, the signal determination unit 34 performs breakdown prediction determination based on the analysis results of the signal analysis unit 33.

That is to say, the signal determination unit 34 determines whether or not the generation frequency of the specific signal within the diagnosis time T exceeds a predetermined specific vibration generation frequency threshold for determination N. In a case where the generation frequency of the specific signal exceeds the specific vibration generation frequency threshold for determination N, the signal determination unit 34 determines that a breakdown of the storage device 10 is predicted. When the signal determination unit 34 determines that a breakdown is predicted, it sends a signal to the computer device 11, and issues a warning to the user or administrator of the computer device 11 via a display device (not shown in the figure of the computer device 11. Furthermore, the signal determination unit 34 stores the generation frequency (analysis data) of the specific vibration generated within the diagnosis time T, in the memory 4.

The generation frequency of the specific vibration gradually increases with progress towards a breakdown. Therefore, by setting an optimal specific vibration generation frequency threshold for determination N, the breakdown of the storage device 10 can be easily predicted. Even if sudden vibrations attributable to sudden disturbances from the exterior, temporary noise of the equipment within the device, and the like, are generated, since the generation frequency thereof is smaller than the vibration generation frequency accompanying progress towards a breakdown, the influence on the breakdown prediction accuracy is small. Consequently, the breakdown prediction device 1 according to the exemplary embodiment of the present invention is able to clearly distinguish between head floating attributable to sudden disturbances, temporary noise of the equipment within the device 20, or the like and head floating accompanying mechanical breakdown degradation of the storage device 20, and a high breakdown prediction accuracy can be realized.

By storing the measurement data, such as the vibration amplitude value A0 and the vibration amplitude value A1 in the memory 4 of the breakdown prediction device 1 of the exemplary embodiment of the present invention, the change with time and the generation time history of the specific vibrations can be easily understood. As a result, the cause of the breakdown of the storage device 10 can be smoothly investigated.

Figure 3:
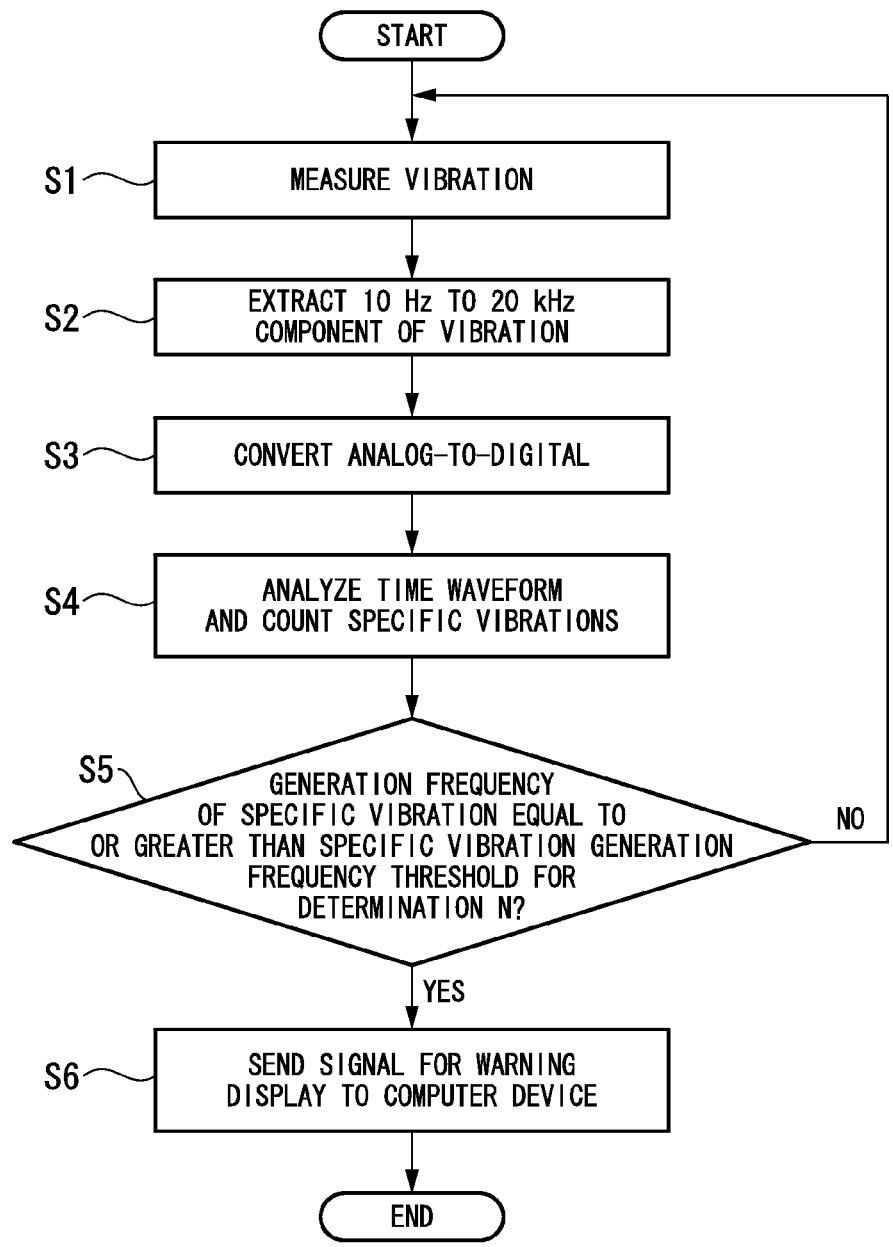
FIG. 3 is a flow chart for describing an operation of the breakdown prediction device of FIG. 1.

Next, the operation of the breakdown prediction device 1 according to the present exemplary embodiment is described with reference to the flow chart shown in FIG. 3. Firstly, in step S1, the vibration counter 2 measures the mechanical vibrations of the storage device 10 and sends the vibration analog signal obtained as a result to the signal removal unit 31 of the signal processor 3, and the processing is advanced to the next step S2. In step S2, the signal removal unit 31 applies a filter to the vibration analog signal and extracts the component of the measured vibration from 10 Hz to 20 kHZ, and the processing is advanced to the next step S3. By means of the filter that extracts the component of the vibration from 10 Hz to 20 kHz, unnecessary signals, such as environmental vibrations, can be removed, and the subsequent vibration data processing can be simplified.

Next, in step S3, the signal conversion unit 32 converts the vibration analog signal from the signal removal unit 31 to a digital signal, and the processing is advanced to the next step S4. By making the sampling frequency in the analog-to-digital conversion approximately 52 kHz or more, which is the signal processing target maximum frequency, the measured vibration data can be nearly faithfully reproduced, and processing with a high accuracy becomes possible.

Next, in step S4, time waveform analysis is performed on the vibration digital signal from the signal conversion unit 32. In a case where the vibration amplitude value A0 exceeds the predetermined upper limit vibration amplitude threshold Amax, the signal analysis unit 33 determines whether or not the vibration amplitude value A1 at the specified time t seconds after the time in which the vibration amplitude thereof is observed is below the lower limit vibration amplitude threshold Amin. In a case where the vibration amplitude value A1 is below the lower limit vibration amplitude threshold Amin, the signal analysis unit 33 counts the vibration in which the vibration amplitude value A0 exceeds the upper limit vibration amplitude threshold Amax, and the vibration amplitude value A1 at the specified time t seconds later is below the lower limit vibration amplitude threshold Amin, as one specific vibration. The signal analysis unit 33 stores the vibration amplitude values A0 and A1 of the specific vibration together with their generation times in the memory 4.

Next, in step S5, the signal determination unit 34 determines whether or not the generation frequency of the specific vibration within the diagnosis time T exceeds a predetermined specific vibration generation frequency threshold for determination N. In a case where the generation frequency of the specific signal exceeds the specific vibration generation frequency threshold for determination N, the signal determination unit 34 determines that a breakdown of the storage device 10 is predicted. In this case, in step S6, the signal determination unit 34 sends a signal for displaying a warning to the computer device 11, and issues a warning to the user or the administrator of the computer device 11 via a display device (not shown in the figure) of the computer device 11. Further, the signal determination unit 34 stores the generation frequency of the specific vibration generated within the diagnosis time T, in the memory 4. On the other hand, in a case where the generation frequency of the specific vibration does not exceed, that is to say, in a case where it is less than the specific vibration generation frequency threshold for determination N, the processing is returned to step S1. The processing of step S1 to step S5 is repeated until the generation frequency of the specific vibration exceeds the specific vibration generation frequency threshold for determination N.

In this manner, according to the breakdown prediction device 1 of the present exemplary embodiment, the vibrations generated from the storage device 10 are measured. In a case where the vibration amplitude value A0 of the measured vibration exceeds the upper limit vibration amplitude threshold Amax, it is determined whether or not the vibration amplitude value A1 at the specified time t seconds after the time in which the vibration amplitude thereof is observed is below the lower limit vibration amplitude threshold Amin. In a case where the vibration amplitude value A1 at the specified time t seconds later is below the lower limit vibration amplitude threshold Amin, the vibration in which the vibration amplitude value A0 exceeds the upper limit vibration amplitude threshold Amax, and the vibration amplitude value A1 at the specified time t seconds later is below the lower limit vibration amplitude threshold Amin is counted as one specific vibration. In a case where the generation frequency of the specific vibration within the diagnosis time T exceeds the specific vibration generation frequency threshold for determination N, breakdown prediction is performed. Consequently, a breakdown in the storage device 20 having mechanical components and mechanical parts can be predicted with a high accuracy. Even if sudden vibrations attributable to sudden disturbances from the exterior, temporary noise of the equipment within the device, and the like, are generated, since the generation frequency thereof is smaller than the specific vibration generation frequency accompanying progress towards a breakdown, the influence on the breakdown prediction accuracy is small. Consequently, the breakdown prediction device according to the exemplary embodiment of the present invention can realize a high breakdown prediction accuracy.

Furthermore, in a case where a breakdown is predicted, since a signal is sent to the computer device 11, and a warning is issued to the user or the administrator of the computer device 11, it is possible to prevent a breakdown of the storage device 20 from occurring, and the economic and the psychological losses accompanying a breakdown can be prevented.

Furthermore, since the frequency component from 10 Hz to 20 kHz is extracted by applying a filter to the vibration analog signal output from the vibration counter 2, unnecessary signals, such as environmental vibrations, can be removed, and the vibration data processing can be simplified.

Moreover, the upper limit vibration amplitude threshold Amax is set from 3 times to 5 times the maximum vibration amplitude value at the time of initial normal operation, and the lower limit vibration amplitude threshold Amin is set from 0.5 times to 1.5 times the maximum vibration amplitude value at the time of initial normal operation. Consequently, the vibrations attributable to the mechanical components and the mechanical parts that configure the storage device 20 can be easily detected.

Furthermore, since the breakdown prediction device 1 operates at either or both of the time of starting up and the time of shutting down the computer device 11 that is loaded with the storage device 10, it does not interfere with the utilization of the computer device 11.

Moreover, since the measurement data and the like are stored in the memory 4, the change with time and the generation time history of the specific vibrations can be easily understood, and the cause of the breakdown of the storage device 10 can be smoothly investigated.

Figure 4:
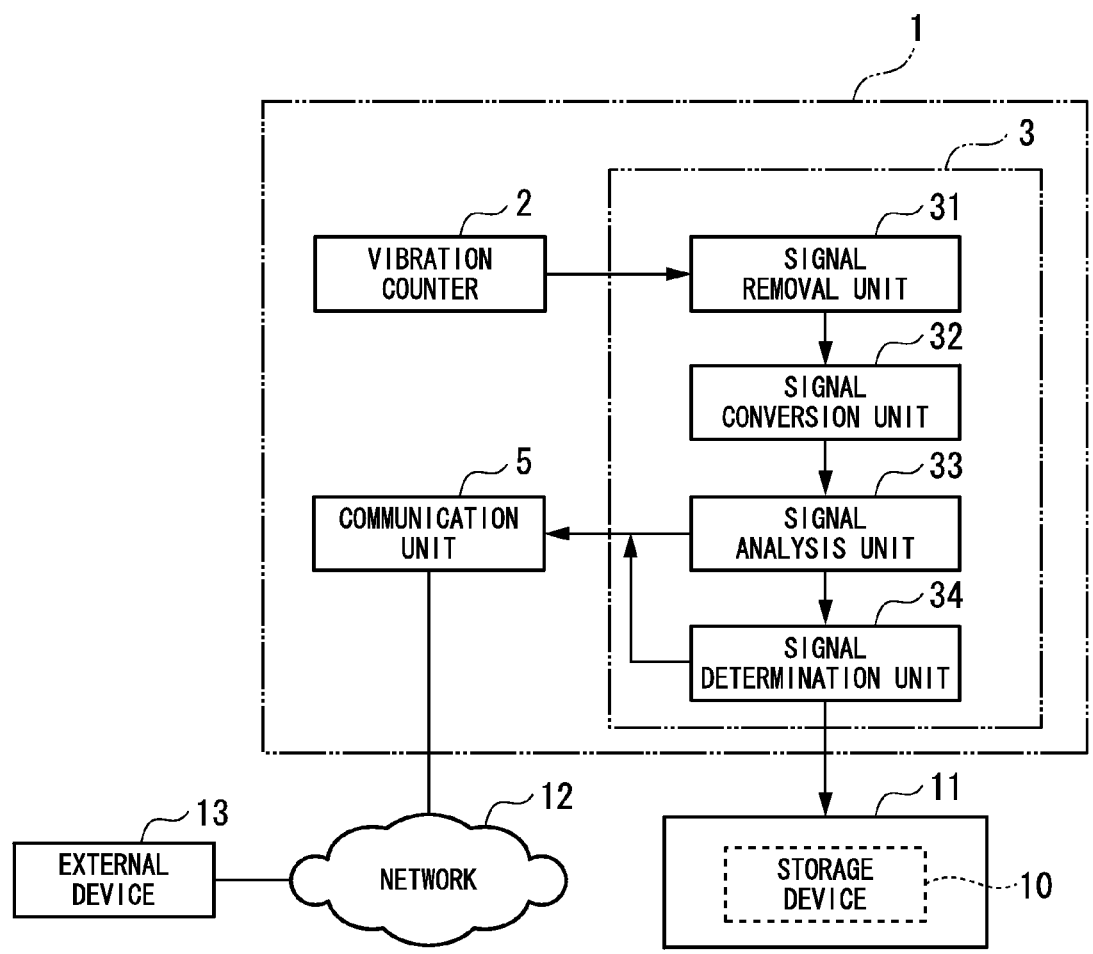
FIG. 4 is a block diagram showing a schematic configuration of an application example of the breakdown prediction device of FIG. 1.
Figure 6:
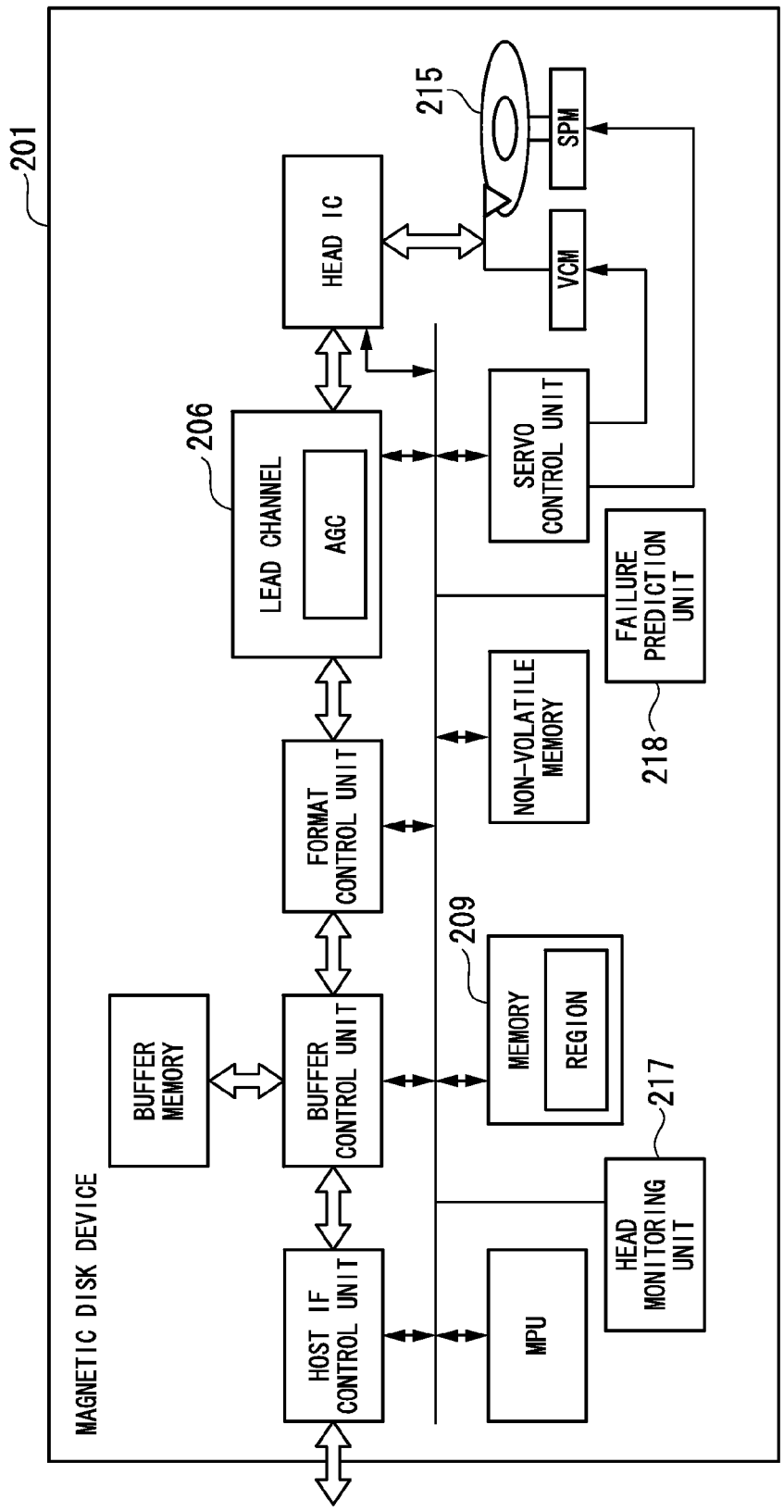
FIG. 6 is a block diagram showing a schematic configuration of a magnetic disk device disclosed in Patent Document 1.
Figure 7:
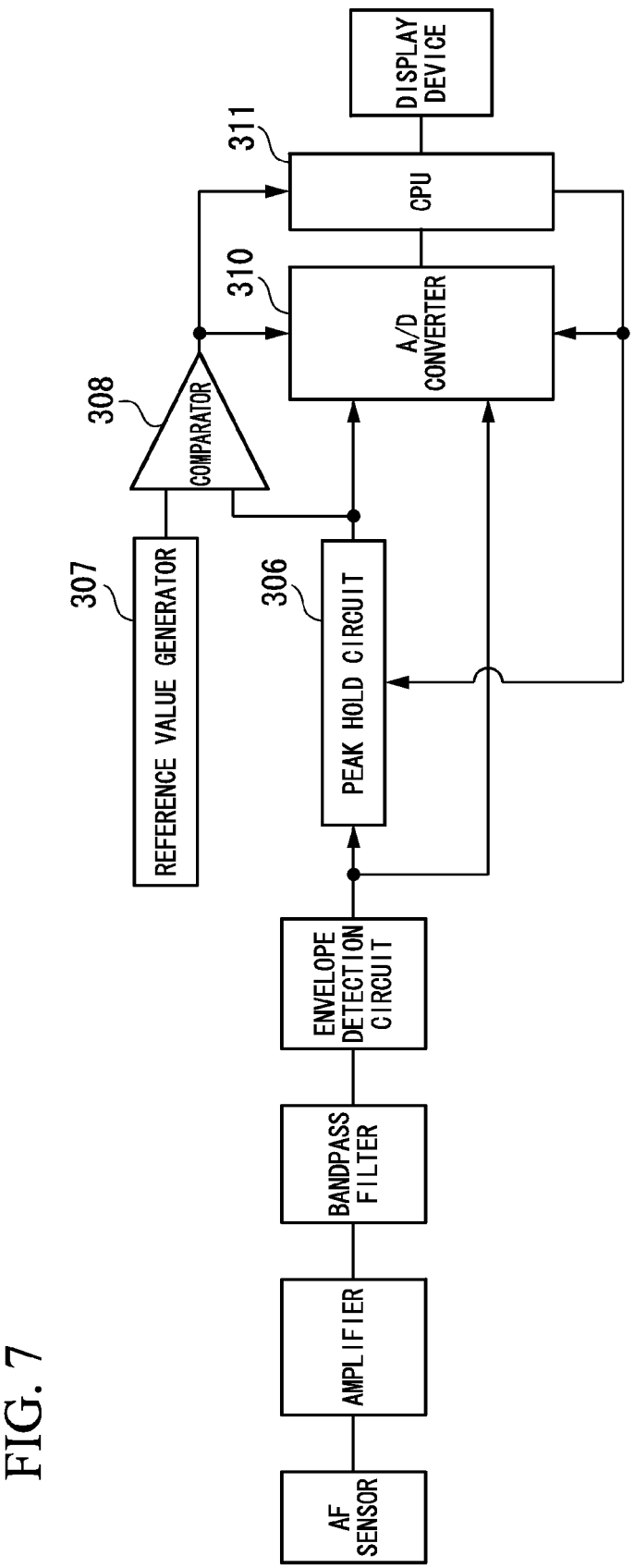
FIG. 7 is a block diagram showing a schematic configuration of a bearing abnormality detection device disclosed in Patent Document 2.

In the breakdown prediction device 1 of the present exemplary embodiment, the measurement data and the analysis data are stored in the memory 4. However it is in no way limited to this. The measurement data and the analysis data may be stored in the storage device 10 of the computer device 11. Furthermore, as shown in FIG. 4, there may be provided a communication unit 5 in which bidirectional communication with a network 12 is possible, and the measurement data and the analysis data may be stored in an external device 13 which is connected to the network 12 and which has a data storing function. The contents of the external device 13 may be made accessible to the developer of the computer device 11 or the developer of the storage device 20. As a result, this can contribute to improved product development.

In the breakdown prediction device 1 of the present exemplary embodiment, in a case where a breakdown is predicted, a warning is issued to the user or the administrator of the computer device 11. However it is in no way limited to this. In a case where a breakdown is predicted, the data stored in the storage device 10 may be automatically backed up to the external device 13.

A program may make a computer execute processing that predicts the breakdown of the device mentioned above.

The computer may be made to execute the processing that predicts the breakdown of the device by recording a program for realizing the functions that predict the breakdown of the device mentioned above on a computer-readable recording medium, and reading and executing the program recorded on this recording medium in a computer system. The "computer system" referred to here includes the OS and the hardware, such as peripheral devices.

With regard to the "computer system", if it is a case where it utilizes a WWW system, it includes a home page-providing environment (or a display environment).

The "computer-readable recording medium" is a portable medium such as a flexible disk, a magneto-optical disk, a ROM, or a CD-ROM, or a storage device such as a hard disk, that is built-in to the computer system. The "computer-readable recording medium" includes those in which the program is dynamically retained for a short time, such as a communication line in a case where the program is transmitted via a network, such as the Internet, or a communication circuit, such as a telephone circuit, and also those in which the program is retained for a fixed time, such as the volatile memory of the interior of the computer system that becomes the server or the client of the case thereof. The program may realize a part of the functions mentioned above, and furthermore, the functions mentioned above may be realized by a combination with a program already recorded on the computer system.

EXAMPLE

As an example of the present invention, a case in which the breakdown prediction device 1 of the exemplary embodiment of the present invention is applied to a magnetic disk device loaded in a computer device is described.

The vibration sensor that measures the vibration of the magnetic disk device is a piezoelectric-type acceleration sensor with a length of 7 mm, a width of 7 mm, and a height of 3 mm. This vibration sensor was fixed to the base side surface of the magnetic disk device by an adhesive tape. The measurable frequency range of the vibration sensor is from 1 Hz to 40 kHz, and the self resonant frequency is 60 kHz or more. With this vibration sensor, higher harmonic components included in the vibrations of the mechanical components and the mechanical parts that configure the magnetic disk device can also be measured.

In view of the measurement performance of the vibration sensor, and vibrations and acoustic signals exceeding 40 kHz being susceptible to being dampened by structural factors, the frequency ranges in which the filter was applied were made 10 Hz and lower, and 20 kHz and higher.

Conversion of the vibration analog signal to a digital signal was performed at a sampling frequency of approximately 52 kHz. Furthermore, the operation of the breakdown prediction device 1 was performed during starting up of the computer device 11.

The diagnosis time T of one time was set to 20 seconds. The upper limit vibration amplitude threshold Amax was set to 5 times the maximum vibration amplitude value at the time of normal operation. The lower limit vibration amplitude threshold Amin was set to 1.5 times the maximum vibration amplitude value at the time of initial normal operation. The specified time t was set to 50 msec. The specific vibration generation frequency threshold for determination N of the specific vibration was set to 100 times.

The method, the dimensions, the installation position, the self resonant frequency, and the measurement frequency range of the vibration sensor, the applied frequency range of the filter, the sampling frequency, and the diagnosis time T, the upper limit vibration amplitude threshold Amax, the lower limit vibration amplitude threshold Amin, the specified time t, and the specific vibration generation frequency threshold for determination N for the breakdown prediction device 1 are in no way limited to this.

With the setting values of the breakdown prediction device 1 mentioned above, the magnetic disk device was continuously operated at a temperature of 85° C. or lower, and the vibrations until a breakdown was reached were measured, and it was investigated if breakdown could be predicted by the present breakdown prediction device 1. With regard to the result, as shown in FIG. 5, by means of the breakdown prediction device 1 of the exemplary embodiment of the present invention, a warning display was generated 3 hours before the breakdown of the magnetic disk device, and the breakdown of the magnetic disk device could be forecast. Furthermore, a measurement was performed under conditions susceptible to disturbances, specifically, under a laboratory environment where three people were working continuously. Even in this case, similarly, a warning display was generated 3 hours before the breakdown of the magnetic disk device, and the breakdown of the magnetic disk device could be forecast. As a result, a breakdown prediction device 1 of a magnetic disk device that was not influenced by sudden vibrations resulting from disturbances, and which had a high breakdown prediction accuracy, was realized. With regard to the operation of the breakdown prediction device 1, even if the measurement was performed intermittently during the normal operation of the computer device 11, such that the reading and writing performance of the magnetic disk device was not lowered, or at the time the operation of the computer device 11 had finished, the same effects could be obtained.

The same effects can be obtained even if the vibrations of the magnetic disk device are measured using an acoustic microphone instead of the vibration sensor. In this manner, according to the present example, even under an environment where sudden vibrations resulting from disturbances are applied, the breakdown prediction of the magnetic disk device can be realized with a high accuracy.

The foregoing has described the present invention with reference to the exemplary embodiment and the example. However the present invention is in no way limited to the exemplary embodiment and the example mentioned above. Various modifications to the configuration and the details of the present invention that may be understood by those skilled in the art may be made within the scope of the present invention.

This application is based upon and claims the benefit of priority from Japanese patent application No. 2010-011193, filed Jan. 21, 2010, the disclosure of which is incorporated herein in its entirety by reference.

Industrial Applicability

The present invention is applicable to devices that utilize a mechanical mechanism, such as disk storage devices including magnetic disk devices and magnetic optical disk devices, and cooling fans, and piezoelectric backlight power sources.

Description of Reference Symbols
1 Breakdown prediction device
2 Vibration counter
3 Signal processor
4 Memory
5 Communication unit
10 Storage device
11 Computer device
12 Network
13 External device
31 Signal removal unit
32 Signal conversion unit
33 Signal analysis unit
34 Signal determination unit

The invention claimed is:

1. A breakdown prediction device comprising:
a vibration measurement unit that measures vibrations generated from a device being monitored; and
a signal processing unit that performs breakdown prediction when a specific vibration is measured at the vibration measurement unit, a maximum vibration amplitude value of the vibration exceeding an upper limit vibration amplitude threshold, and a vibration amplitude value thereof being below a lower limit vibration amplitude threshold at a point in time when a specified time is reached from a point in time when the vibration exceeds the upper limit vibration amplitude threshold.

2. The breakdown prediction device according to claim 1, wherein the signal processing unit performs breakdown prediction based on a generation frequency of the specific vibration.

3. The breakdown prediction device according to claim 1, wherein the signal processing unit extracts a frequency component from 10 Hz to 20 kHz of the vibrations measured by the vibration measurement unit, and processes the frequency component.

4. The breakdown prediction device according to claim 1, wherein the upper limit vibration amplitude threshold is from 3 to 5 times a maximum vibration amplitude value at a time of normal operation, and the lower limit vibration amplitude threshold is from 0.5 to 1.5 times the maximum vibration amplitude value at the time of the initial normal operation.

5. The breakdown prediction device according to claim 1, further comprising: a memory for storing data,
wherein the signal processing unit stores data measured by the vibration measurement unit, and data analyzed by the signal processing unit in the memory.

6. The breakdown prediction device according to claim 1, further comprising: a communication unit that performs communication with an external device which has a data storing function,
wherein the communication unit stores data measured by the vibration measurement unit and data analyzed by the signal processing unit in the external device.

7. A breakdown prediction method comprising:
a vibration measurement step of measuring vibrations generated from a device being monitored; and
a signal processing step of performing breakdown prediction when a specific vibration is measured at the vibration measurement step, a maximum vibration amplitude value of the vibration exceeding an upper limit vibration amplitude threshold, and a vibration amplitude value thereof being below a lower limit vibration amplitude threshold at a point in time when a specified time is reached from a point in time when the vibration exceeds the upper limit vibration amplitude threshold.

* * * * *